(12) United States Patent
Bayersdorfer et al.

(10) Patent No.: US 9,067,530 B2
(45) Date of Patent: Jun. 30, 2015

(54) ILLUMINATED INTERIOR EQUIPMENT COMPONENT FOR A VEHICLE

(75) Inventors: Bernhard Bayersdorfer, Baierbach (DE); Daniel Forster, Landshut (DE); Heinz Husseck, Obertaufkirchen (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 84 days.

(21) Appl. No.: 13/806,262

(22) PCT Filed: Jun. 3, 2011

(86) PCT No.: PCT/EP2011/059197
§ 371 (c)(1),
(2), (4) Date: Feb. 26, 2013

(87) PCT Pub. No.: WO2012/000737
PCT Pub. Date: Jan. 5, 2012

(65) Prior Publication Data
US 2013/0148373 A1    Jun. 13, 2013

(30) Foreign Application Priority Data

Jun. 29, 2010 (DE) .......................... 10-2010-030-660

(51) Int. Cl.
*F21V 9/00* (2006.01)
*B60Q 3/00* (2006.01)
(Continued)

(52) U.S. Cl.
CPC ................ *B60Q 3/002* (2013.01); *B60Q 3/004* (2013.01); *B60Q 3/0286* (2013.01);
(Continued)

(58) Field of Classification Search
CPC ....... B60Q 3/002; B60Q 3/004; B60Q 3/0289
USPC .................. 362/487, 501, 503, 511
See application file for complete search history.

(56) References Cited

U.S. PATENT DOCUMENTS 5,709,453 A * 1/1998 Krent et al. ............... 362/496
6,769,799 B2 * 8/2004 Goto et al. ................ 362/551
(Continued)

FOREIGN PATENT DOCUMENTS

DE           101 35478 A1    4/2003
DE    10 2008 017345 A1    11/2008
(Continued)

OTHER PUBLICATIONS

International Search Report and Written Opinion mailed Sep. 2, 2011 for Application No. PCT/EP2011/059197.
(Continued)

*Primary Examiner* — Ali Alavi
(74) *Attorney, Agent, or Firm* — Wolf, Greenfield & Sacks, P.C.

(57) ABSTRACT

The invention relates to an interior equipment component for a vehicle, comprising a light emission element for emitting light and a strip-shaped light guide element. The light guide element has here a first surface and a second surface, wherein the first surface is one of the two largest surfaces of the light guide element, and the second surface is a surface which deviates therefrom, and the first surface comprises an input face. In addition, the light guide element and the light emission element are arranged and configured in such a way that light from the light emission element can be input into the light guide element via the input face and can be output via the second surface.

18 Claims, 1 Drawing Sheet

(51) Int. Cl.
*B60Q 3/02* (2006.01)
*F21V 8/00* (2006.01)
*B60R 13/02* (2006.01)

(52) U.S. Cl.
CPC ......... *B60Q 3/0289* (2013.01); *B60Q 2500/10* (2013.01); *B60R 2013/0287* (2013.01); *G02B 6/001* (2013.01); *G02B 6/0011* (2013.01); *G02B 6/0028* (2013.01)

(56) References Cited

U.S. PATENT DOCUMENTS 7,357,548 B2 * 4/2008 Haenen et al. ............ 362/551

2003/0200684 A1 10/2003 Wolf

FOREIGN PATENT DOCUMENTS

| DE | 10 2007 058 272 A1 | 6/2009 |
|----|---|---|
| EP | 1 101 655 A2 | 5/2001 |
| EP | 1 356 995 A2 | 10/2003 |
| FR | 2 829 563 A1 | 3/2003 |
| JP | 2009-262911 A | 11/2009 |

OTHER PUBLICATIONS

International Preliminary Report on Patentability mailed Jan. 17, 2013 for Application No. PCT/EP2011/059197.

* cited by examiner

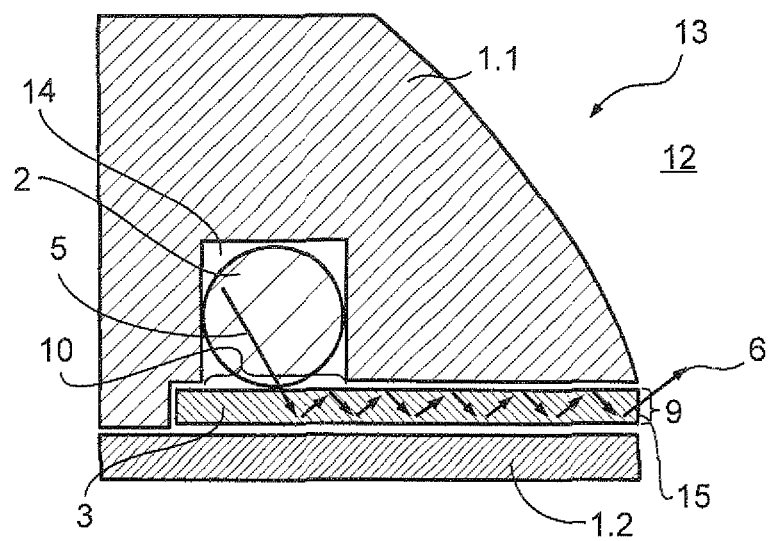
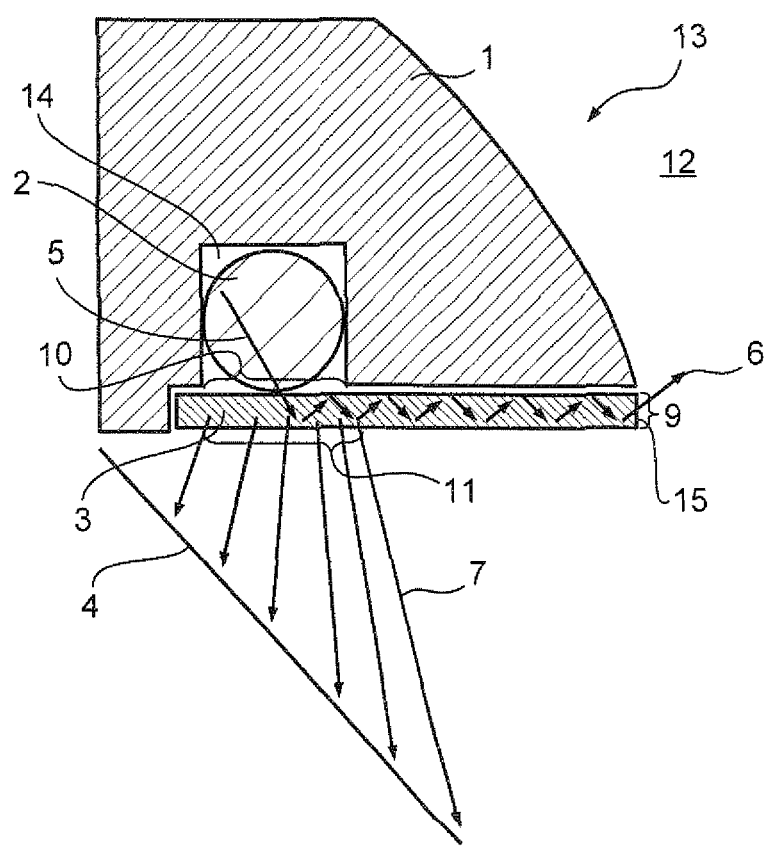

ILLUMINATED INTERIOR EQUIPMENT COMPONENT FOR A VEHICLE

TECHNICAL FIELD

The invention relates to an interior equipment component for a vehicle, comprising a light emission element for emitting light, and a strip-shaped light guide element.

PRIOR ART

It is known to use diffuse and indirect illumination for illuminating the interior of a vehicle. For indirect illumination, a light source is conventionally arranged in a concealed manner so that the only visible portion of the light is the portion that is reflected via a reflective layer in the vicinity of the light source in the direction of the viewer in the vehicle interior.

DE 100 26 385 A1 describes an interior illumination device for vehicles, in which there is provided in an interior lining a light source which is intended to create in the interior of a vehicle illumination that is perceived to be pleasant. This known device uses indirect diffuse light for illuminating various elements in the vehicle interior.

In the indirect illumination of the vehicle interior, there is the problem that the light intensity perceived by a vehicle occupant depends greatly on the properties of the reflective layer which is illuminated by the illumination device. If that surface consists of dark or matt materials, a large proportion of the emitted light is absorbed and the illuminating effect of the illumination is only very slight. By contrast, the same illuminating power of the light source leads to light intensities that are perceived as being very bright if the reflective layer has light areas. Accordingly, the effectiveness of the illumination depends to a large extent on the color of the interior of the vehicle, so that it is difficult to provide consistent illumination for vehicles with different colored interiors.

A further disadvantage of indirect illumination is the comparatively small proportion of the emitted light that is actually available for illumination. This is due to the absorption coefficients of the illuminated materials.

In the case of direct illumination, on the other hand, the problem is that there is virtually no freedom in terms of design and adaptation of the illumination to individual requirements in the vehicle.

DESCRIPTION OF THE INVENTION

The object of the present invention is to provide an interior equipment component for a vehicle of the above technical field, which permits illumination in the vehicle interior that is perceived to be pleasant and at the same time offers great freedom in the configuration of the interior equipment component including the elements used for the illumination.

According to the invention, the object is achieved by the subject-matter of independent claim 1.

An interior equipment component according to the invention for a vehicle comprises a light emission element for emitting light, and a strip-shaped light guide element, wherein the light guide element has a first surface and a second surface, wherein the first surface is one of the two largest surfaces of the light guide element and the second surface is a surface other than those two surfaces, wherein the first surface comprises an input surface, wherein the light guide element and the light emission element are arranged and configured such that light from the emission element can be input into the light guide element via the input face and output via the second surface.

The input face arranged on the first surface is preferably always larger than the second surface.

A strip shape is distinguished by the fact that it is flat and its base or cross-sectional areas are substantially rectangular, the strip shape being formed by two sides whose surfaces are largest in relation to the remaining sides.

Substantially rectangular is here also understood as meaning that the light guide element can have concave or convex curved sides, or two opposing sides can have different lengths (for example triangular or trapezoidal profiles).

Flat in this case means that the maximum size of the strip perpendicular to the base area is not more than half the maximum size of the strip in the direction of the base area.

The strip-shaped light guide element is suitable for guiding light along two non-parallel paths. The light guide element is preferably deformable, so that it can form a flat strip and, for example, can also be wavy, twisted or curved. In particular, the strip-shaped light guide element can be a substantially planar element with a substantially rectangular base area. In addition to a deformable light guide element, there can also be provided according to the invention a pre-formed, rigid strip-shaped light guide element which, during its production, is already given the form which it is ultimately to assume in the interior equipment component. This form can be flat, wavy, curved or otherwise shaped, a strip shape being used as the starting point. The light guide element can be produced, for example, by injection moulding processes, for example from PMMA or PC or another suitable material.

In the light guide element, the light is guided along two non-parallel paths, which means that a two-dimensional diffusion of the light is effected by the light guide element. The strip-shaped light guide element, in particular, therefore, a light guide film, does not have to be present in the form of a mathematical plane but can be twisted, wavy or otherwise shaped, in particular adapted to the contour of an interior equipment component for a vehicle, without departing from the meaning of substantially two-dimensional light guiding.

In the meaning according to the invention, "shaped" is also understood as meaning that the light guide element is so curved that a bending line runs substantially parallel to the imaginary line that separates the input face from the remainder of the first surface.

As a result of the configuration according to the invention of the interior equipment component, it is possible to achieve point and linear illumination with very small dimensions, in particular a very small line width. This advantage is achieved in that the light guide properties are utilized in such a manner that the light is input via a first large face and is output, that is to say emitted, via a second small face. The area ratio between the first and second surfaces is preferably at least two to one, but can preferably also be greater, in particular at least five to one, ten to one or greater.

Point illumination within the above meaning can be achieved in particular in that the second surface is able to emit light only in places. This can be achieved, for example, by treating the second surface by covering parts of the surface with a layer having a corresponding effect.

Preferably, the second surface measures not more than 3 mm, preferably not more than 1 mm, particularly preferably not more than 0.3 mm, in one surface direction.

The expression "surface direction" means one of the directions along which the second surface extends. The extent of the second surface according to this preferred embodiment therefore does not exceed the above-mentioned values at least in sections in one direction.

The longitudinal extent of the light guide element and of the light emission element and the contouring thereof can be chosen in dependence on the interior equipment of the vehicle. In particular, the length thereof can be determined by the vehicle component.

Accordingly, it is possible to produce particularly thin lines of light or points of light. The advantage of particularly thin lines or points is inter alia that such light patterns on the one hand can be used as decorative elements and on the other hand permit illumination of a vehicle interior which can illuminate with an intensity that is largely independent of the color of the vehicle interior and can provide pleasant illumination of the vehicle interior. In addition, energy can thus be saved, because the light emitted by the light emission element can be emitted into the vehicle interior via the light guide element without necessarily having to be reflected at surfaces which in some cases are absorbing. The advantage of diffuse and/or indirect illumination, which inter alia is the pleasant ambiance in the vehicle interior, does not have to be given up.

Advantageously, the surface area of the first surface measures at least twice, preferably at least five times, particularly preferably at least ten times, the surface area of the second surface. Such area ratios mean in particular that a particularly thin line of light can be produced.

The light emission element is preferably accommodated in a recess which has an opening pointing in the direction of the light guide element. Accordingly, it is possible to accommodate the light emission element in a space-saving manner on the light guide element and efficiently input light emitted by the light emission element into the light guide element.

The opening of the recess preferably defines an area that is smaller than or equal to the input face of the light guide element. Such a configuration of the decorative part results in the advantage that a particularly large proportion of the light emitted by the light emission element can be input into the light guide element.

Also preferably, the recess has reflective surfaces. Such surfaces allow the light emitted by the light emission element in a different direction than that of the light guide element to be used. Reflective surfaces can be formed in particular by metal coating the surfaces or by providing a light, for example white, surface.

It is further advantageous if the reflective surfaces are configured such that the sum of the light directly and indirectly striking the light guide element is virtually constant over the extent of the light guide element. This is important in particular when the light output of the light emission element varies over its length and the light output directed directly in the direction of the light guide element accordingly varies.

To that end, the reflective surfaces can be in the form of, for example, an arrangement of spaced strips of a reflective material having a specific width, the spacing of which is chosen in dependence on the reflection that is to be achieved.

In a preferred embodiment, the second surface is immediately visible to a viewer, in particular a vehicle occupant. The arrangement of the second surface on the interior equipment component according to this embodiment overcomes the disadvantages of indirect linear illumination and accordingly results in a well-illuminated vehicle interior, it being possible for the light guide element to be positioned such that the second surface can perform a decorative and informative function in addition to its illumination function.

The second surface is preferably treated, in particular coated, covered, roughened, mirrored or painted, at least in sections. This treatment of the second surface allows the light emitted by the light guide element to be controlled and structured. For example, the treatment of the second surface can be the provision of a transparent, semi-transparent or non-transparent coating. A transparent coating allows light substantially to pass. Semi-transparent coatings can filter out particular colors, for example. In addition, a non-transparent coating of the second surface is also conceivable, which coating is preferably provided only in certain regions of the second surface and substantially does not allow light to pass.

The light guide element is advantageously a planar film of a light-conducting material. Such a light guide film allows the area ratio according to the invention between the first and second surfaces to be obtained in a particularly simple manner. For the inputting of light into the light guide film, the planar surface of the light guide film is used. The light input into the light guide film can then be output via one of the edges of the light guide film having a substantially smaller surface area than the face of the light guide film, so that the edge of the light guide film can produce on the interior equipment component, for example, a very thin and yet bright line of light.

In a further preferred embodiment, the light emission element itself comprises a light guide from which light can be input into the light guide element.

A "light emission element" is to be understood in principle as being an element which, for example, converts electrical energy into electromagnetic radiation, which is emitted as visible, infra-red or ultraviolet light. In particular, the light emission element can accordingly be light-emitting diodes, incandescent lamps, halogen lamps or gas discharge lamps. In order to facilitate the construction of the interior equipment component, however, it is preferred for the light generated in the light emission element to be emitted via a light guide, so that it is thus transported in a convenient and reliable manner to virtually any location of the interior equipment component and is there input into the light guide element of the interior equipment component.

In an alternative embodiment, the light guide element and the light emission element are arranged and configured such that light can be output via the second surface and at the same time via a third surface, the surface area of which is greater than that of the second surface, the third surface preferably running substantially parallel to the first surface.

According to this alternative embodiment, it is thus possible for the light that is input into the light guide element on the one hand to produce a thin, sharp line of light via the second surface and on the other hand to emit a diffuse light via the third surface. The third surface can be the face of the film opposite the first surface, at which the part of the light from the light emission element that has passed through the light guide element is output without being directed in the direction of the second surface. In order to control the output of the light through the third surface, the third surface too, analogously to the second surface, can be treated at least in sections, that is to say in particular coated, covered, roughened, mirrored or painted, as has been described above.

Both the second and the third surfaces can be provided with an additional layer in order, for example, to produce additional effects. The additional layer can be a transparent or semi-transparent or non-transparent layer, via which, for example, the light output to part of the above-mentioned surfaces is suppressed or the properties of the light, for example the visible color of the light, are influenced.

The light guide element is advantageously colorless. The colorless form of the light guide element allows the color of the light output from the light guide element to be determined by the color of the light emitted by the light emission element.

In particular, it is thus possible to produce in a particularly elegant manner an interior equipment component which has a second surface with illumination that is multi-colored or alternates between different colors.

In a further preferred embodiment, the light guide element has diffuser particles. Diffuser particles in the light guide element facilitate the inputting of light into the light guide element because they scatter light in the light guide element also in directions that run perpendicular to the direction in which the light from the light emission element arrives at the light guide element. Such diffuser particles can be colorless as well as colored.

In a further preferred embodiment, the light guide element has luminescent, in particular fluorescent, particles. Such particles, like the general diffuser particles, lead to a relatively great efficiency in terms of the inputting of the light emitted by the light emission element, because that light can be scattered at the particles or excite them to emit light. Furthermore, the particles can make up for slight defects in the light guide element, so that, in addition, the demands made of the light guide element and the configuration of the light emission element, insofar as it comprises a light guide element, do not have to be as high as would be the case, for example, without diffuser particles. In the case of fluorescent particles in particular, the color of the illumination of the interior equipment component can also be determined by the color of the fluorescent particles, and special fluorescent effects can be produced.

The light emission element and the light guide element are preferably integral. This can be achieved, for example, by 2K injection molding, wherein a film acting as the light guide element is inserted into an injection mold and a light guide, which serves as part of the light emission element, is applied by injection molding. It is also conceivable for both the light guide element and part of the light emission element to be injection molded.

The light emission element advantageously emits light of different wavelength ranges. Different wavelength ranges are to be understood as meaning that light of different colors can be emitted by the light emission element. In particular, the light emission element can also or only emit light in the invisible wavelength range, in particular UV light. A wavelength range can be characterized and preferably terminated by the wavelength of the light of maximum intensity, that is to say terminated at its edges in the wavelength spectrum by wavelengths with recognisably decreasing intensity, in particular in each case by a threshold wavelength with vanishing intensity.

An advantage of a light emission element that emits only in the invisible spectral range, for example UV light, is that no slit light can thereby form, because only light that is converted in the light guide element, for example by fluorescence, and accordingly only the light that is output from the light guide element becomes visible, while light that is not output by the light guide element remains invisible.

In an alternative embodiment, the first surface or a third surface, parallel to the first surface, of the light guide element has a structure which is configured in view of enhanced deflection of the input light in the direction of the second surface. For example, this could be effected by printed or embossed elevations or depressions in the form of pyramids, spherical recesses or similar structures, in particular relief-like structures, known to the person skilled in the art. A rough surface of the light guide element enables the inputting of the light emitted by the light emission element into the light guide element to be facilitated and the light output additionally to be increased.

In addition to light emission elements which emit light in the visible range, it is possible to use, for example, a light emission element for shorter wavelengths, a black light tube or a corresponding UV light-emitting diode. An advantage of the use of light in the UV range arises in particular in connection with the use of fluorescent particles in the light guide element, because the particles are excited by the UV light and can emit light of a predetermined color. In that manner, special optical effects arising from the fluorescence of the particles in the light guide element can be achieved. At the same time, there is no risk that emitted light will accidentally become visible to the vehicle occupants through gaps or cracks in the components of the light emission element.

A fundamental advantage of the interior equipment component according to the invention is that even complex two- or three-dimensional contours of the illuminating second surface can easily be converted, so that the possible configurations for the interior equipment component are virtually unlimited.

Further advantages and features of the invention will become apparent from the following description of the figures and the totality of the patent claims.

BRIEF DESCRIPTION OF THE FIGURES

FIG. 1 shows a first embodiment of an interior equipment component in a sectional view;

FIG. 2 shows a second embodiment of an interior equipment component in a sectional view.

WAYS OF CARRYING OUT THE INVENTION

FIG. 1 shows a first embodiment of an interior equipment component 13 in a sectional view. The interior equipment component 13 has a two-part base body 1.1, 1.2, into which a groove 14 has been introduced. The groove 14 runs substantially perpendicular to the section which is shown in FIG. 1. In this view, the groove 14 has a cross-section of 3×3 mm and is suitable for receiving a light guide 2, which has a diameter of about 3 mm. The light guide 2 in FIG. 1 corresponds to the light emission element for emitting light, because it is fed via one or more light sources (not shown) and emits light in the direction of the open side of the groove 14.

The light guide 2 shown in FIG. 1 emits light in all directions, so that it can be introduced into the groove 14 without any particular orientation. In order to increase the proportion of light directed in the desired direction, the shape of the groove can be configured correspondingly, or the groove could be coated with a highly reflective material (e.g. a white or reflecting film). In order to compensate for the decrease in the amount of light emitted by the light guide 2 directly in the direction of the light guide element 3 that occurs in the case of a lateral arrangement of light sources at the light guide 2 as the distance from the light sources increases, the groove 14 can be variably coated with a reflective material in such a manner that the sum of the light striking the light guide element 3 directly and—by reflection at the surface of the groove 14—indirectly is virtually constant over the extent of the light guide 2.

However, in the case of a light emission element that emits unevenly, for example in a controlled manner, it is preferred to provide a locking device which ensures that the light emission element is oriented correctly in the groove 14.

Adjacent to the light guide 2 there is arranged a strip-shaped fluorescent film 3, which has a first surface. The first surface of the fluorescent film 3 has an input face 10, which extends over the open side of the groove 14. The light of the light guide 2 is accordingly input via the input face 10 of the first surface into the fluorescent film 3 acting as the light guide element, and is guided therein.

FIG. 1 shows schematically a light beam 5, which is emitted by the light guide 2, that is to say the light emission element, into the fluorescent film 3, that is to say the light guide element, and is accordingly input therein.

The light input into the fluorescent film 3 is directed therein in the direction of the edge 15 of the fluorescent film 3.

The fluorescent film 3 is a substantially planar element, a cross-section perpendicular to one of the two main orientations of the fluorescent film being shown in the sectional view of FIG. 1.

The second surface 9, via which the light 6 output from the fluorescent film 3 is emitted, is defined at the edge 15 of the fluorescent film 3.

It will be seen in FIG. 1 that the dimensions of the first surface (and also of the input face 10) and of the second surface 9 in the direction of this cross-sectional view are in a ratio to one another such that the first surface is substantially larger than the second surface 9.

The extent of the second surface 9 at the edge 15 of the fluorescent film 3 in the direction shown in FIG. 1 (top-bottom in FIG. 1) is 0.3 mm, so that the interior equipment component 13 as a whole has a very thin, sharp illumination line.

From the region 12 in which a vehicle occupant is typically seated, the fluorescent film 3 is therefore to be seen as a line of light.

The embodiment shown in FIG. 1 as a sectional view has an interior equipment component 13 with a length of about 1000 mm, this length being measured perpendicularly to the drawing plane of FIG. 1. In this embodiment, the fluorescent film 3 runs over the entire length of about 1000 mm of the interior equipment component and extends from the visible surface of the interior equipment component 13 in the direction of the light guide 2 over up to 100 mm.

It will be appreciated that the light guide element can also be a different, non-fluorescent film or a different light-guiding element. The dimensions described in connection with the embodiment shown by way of example in FIG. 1 are also merely exemplary in nature.

The embodiment of FIG. 1 shows an enclosed interior equipment component, in which the fluorescent film 3 is accordingly covered by the part 1.2 of the interior equipment component 13 on the side remote from the light guide 2 and is thereby prevented from emitting light in that direction.

FIG. 2 shows a second embodiment of an interior equipment component 13 for a motor vehicle. The same elements as in FIG. 1 are provided with the same reference numerals in FIG. 2. An explicit description of these elements is therefore not given in the following.

In contrast to the embodiment of FIG. 1, the embodiment of FIG. 2 has only a one-part base body 1, in which the groove 14 is formed. On the side of the strip-shaped fluorescent film 3 remote from the light guide 2, however, there is no enclosure as produced in the embodiment of FIG. 1 by the part 1.2 of the interior equipment component 13. Partial enclosure is, however, entirely possible in this embodiment. The enclosure can in principle also be replaced by a suitable coating. In the embodiment shown in FIG. 2, the enclosure can be provided, for example, in the locations that are not directly opposite the light guide 2. With regard to the configuration of an enclosure or corresponding coating, however, there is creative freedom.

For that reason, it is possible in the embodiment of FIG. 2 that light 5 emitted by the light guide 2 can pass through the fluorescent film 3 and be directed onto a reflective surface 4.

The emitted light 7 thereby emerges through a third surface 11 of the fluorescent film 3, which surface 11 is opposite the first surface of the fluorescent film 3 and is remote from the light guide 2.

In that manner it is possible by means of the interior equipment component 13 on the one hand to produce a sharp, thin line of light via the edge 15 of the fluorescent film 3 and on the other hand also to provide an indirect diffuse light via the reflective surface 4.

In the embodiments of FIGS. 1 and 2, the light emitted by the light guide 2 can in particular have a shorter wavelength than the light output by the fluorescent film 3, because the latter is generated by the excitation of the fluorescence and accordingly transports less energy. The fluorescence in the fluorescent film 3 can be excited, for example, by the inputting of black light of a neon tube, white LEDs or daylight.

An example of a fluorescent film which can be used is the film with the name "Makrofol DE 1-1 CC fl (LISA)" manufactured and marketed by Bayer MaterialScience. This type of film is available in different colors, that is to say the fluorescent particles in this film emit light of different wavelengths, which can be chosen.

In an alternative embodiment of the invention using a colorless film instead of the fluorescent film 3, it can be expedient to structure the film surface in the region of the face 10 or on both sides of the film, in order to permit better inputting of the light emitted by the light guide 2. The reason for this is that light can more easily be input into a film acting as light guide by a structured surface and the associated defects in the surface of the film, because this is otherwise possible to only a small extent through the surface of the light guide film, which is optimized for reflection.

Alternatively and in addition to the structuring of surface regions of the films, the provision of colorless or colored diffuser particles, for example of glass beads or PMMA beads, such as the beads denoted DF 21 from Degussa, is to be preferred. Such particles effect a scattering of light within the film and thus likewise facilitate the inputting of light into the film. In principle, the structuring of a surface can be combined as desired with the incorporation of fluorescent or non-fluorescent diffuser particles both in the case of a fluorescent light guide film and in the case of a clear light guide film.

The embodiments described above can be combined with one another as desired in respect of their features.

The interior equipment component according to the invention provides an interior equipment component for a vehicle which permits linear illumination with a very small line width or point illumination with a very small point size and, in addition, pleasant lighting that is largely independent of the color of the interior equipment of a vehicle.

The invention claimed is:

1. An interior equipment component for a vehicle, the component comprising:
   a light emission element for emitting light, the light emission element including a light guide; and
   a strip-shaped light guide element;
   wherein the light guide element has a first surface and a second surface, wherein the first surface is one of the two largest surfaces of the light guide element and the second surface is a surface other than those two surfaces
   wherein the first surface comprises an input face;
   wherein the light guide element and the light emission element are arranged and configured such that light from the light guide of the light emission element can be input into the light guide element via the input face and output via the second surface; and wherein the second surface is treated, in particular coated, covered, roughened, mirrored or painted, at least in sections.

2. The interior equipment component as claimed in claim 1, wherein the second surface measures not more than 3 mm, preferably not more than 1 mm, particularly preferably not more than 0.3 mm, in a surface direction.

3. The interior equipment component as claimed in claim 1, wherein the surface area of the first surface measures at least twice, preferably at least five times, particularly preferably at least ten times, the surface area of the second surface.

4. The interior equipment component as claimed in claim 1, wherein the light emission element is accommodated in a recess which has an opening pointing in the direction of the light guide element.

5. The interior equipment component as claimed in claim 4, wherein the recess has reflective surfaces.

6. The interior equipment component as claimed in claim 4, wherein the reflective surfaces present in the recess are configured such that the sum of the light directly and indirectly striking the light guide element is virtually constant over the extent of the light guide.

7. The interior equipment component as claimed in claim 1, wherein the surface area of the input face is greater than the surface area of the second surface.

8. The interior equipment component as claimed in claim 1, wherein the second surface is immediately visible to a viewer, in particular a vehicle occupant.

9. The interior equipment component as claimed in claim 1, wherein the light guide element is a planar film of a light-conducting material.

10. An interior equipment component for a vehicle, the component comprising:
a light emission element for emitting light; and
a strip-shaped light guide element;
wherein the light guide element has a first surface and a second surface, wherein the first surface is one of the two largest surfaces of the light guide element and the second surface is a surface other than those two surfaces;
wherein the first surface comprises an input face;
wherein the light guide element and the light emission element are arranged and configured such that light from the light emission element can be input into the light guide element via the input face and output via the second surface;
wherein the second surface is treated, in particular coated, covered, roughened, mirrored or painted, at least in sections; and
wherein the light guide element and the light emission element are arranged and configured such that light can be output via the second surface and via a third surface, the surface area of which is greater than that of the second surface, wherein the third surface preferably runs substantially parallel to the first surface.

11. The interior equipment component as claimed in claim 10, wherein the second surface measures not more than 3 mm, preferably not more than 1 mm, particularly preferably not more than 0.3 mm, in a surface direction.

12. The interior equipment component as claimed in claim 10, wherein the surface area of the first surface measures at least twice, preferably at least five times, particularly preferably at least ten times, the surface area of the second surface.

13. The interior equipment component as claimed in claim 10, wherein the light emission element is accommodated in a recess which has an opening pointing in the direction of the light guide element.

14. The interior equipment component as claimed in claim 13, wherein the recess has reflective surfaces.

15. The interior equipment component as claimed in claim 14, wherein the reflective surfaces present in the recess are configured such that the sum of the light directly and indirectly striking the light guide element is virtually constant over the extent of the light guide.

16. The interior equipment component as claimed in claim 10, wherein the surface area of the input face is greater than the surface area of the second surface.

17. The interior equipment component as claimed in claim 10, wherein the second surface is immediately visible to a viewer, in particular a vehicle occupant.

18. The interior equipment component as claimed in claim 10, wherein the light guide element is a planar film of a light-conducting material.

* * * * *